United States Patent [19]
Calderoni

[11] 4,104,943
[45] Aug. 8, 1978

[54] CONTOUR DIE MILLING WITH A TOROIDAL CUTTER

[75] Inventor: Sergio L. Calderoni, Dearborn, Mich.

[73] Assignee: General Motors Corporation, Detroit, Mich.

[21] Appl. No.: 780,923

[22] Filed: Mar. 24, 1977

[51] Int. Cl.² .............................................. B23B 3/00
[52] U.S. Cl. .................................. 90/11 C; 90/15 R; 51/33 R
[58] Field of Search .................. 90/11 R, 11 C, 15 R; 51/124 L, 124 R, 96, 33 R

[56] References Cited
U.S. PATENT DOCUMENTS

| 155,052 | 9/1874 | Uhlinger ........................ 90/15 R X |
| 1,634,322 | 7/1927 | Dornes, Jr. ........................ 90/15 R |
| 3,262,368 | 7/1966 | Attermeyer et al. ................ 90/11 R |

FOREIGN PATENT DOCUMENTS 317,586  12/1919  Fed. Rep. of Germany .......... 90/11 R

*Primary Examiner*—Gil Weidenfeld
*Attorney, Agent, or Firm*—Robert M. Sigler

[57] ABSTRACT

A contoured die surface is milled with a toroidal cutter and a three axis milling machine by orienting the toroidal cutter with its axis of rotation at an acute angle substantially greater than 0° with respect to the plunge direction of the milling machine, driving the toroidal cutter from the milling machine and passing the cutter over substantially all the die surface in engagement therewith while maintaining the acute angle constant and moving the cutter in the plunge direction according to a predetermined program.

1 Claim, 12 Drawing Figures

CONTOUR DIE MILLING WITH A TOROIDAL CUTTER

BACKGROUND OF THE INVENTION

This invention relates to the milling of contoured die surfaces, and particularly to the milling of large dies with concave or convex surfaces, which are used in the stamping of sheet metal parts for motor vehicles. The milling of contour surfaces on such dies with prior art methods is a time consuming process. First the surface to be milled must be mentally broken down into a plurality of subsurfaces or areas, the number depending upon the particular configuration of the contour surface desired. Each subsurface or area must then be milled separately with an end mill cutter, in the case of a convex surface, proceeding from low points to a high points on the surface. In the case of a concave subsurface or area, a ball nose cutter must first create a channel at the low points of the surface; and an end mill cutter must then be used proceeding from the channel to high points on each side of the channel.

Since an end mill cutter is basically cylindrical in shape and cuts on an edge at one axial end, it cannot be used to sweep across the contoured die surface from one end to the other, since it would have to change cutting edges at each high point or low point in the die surface. This necessitates much complexity and wasted motion in the milling. In cases where the ball nose cutter must be used, an extra step is required; and, in addition, the ball nose cutter is rather inefficient and time consuming itself in the removal of metal, since the speed of the cutting surface relative to the cut surface decreases to practically zero at the axial tip thereof.

After the milling with the three axis milling machine is completed, the contoured surface is covered with scalloped channels left by the circular cutting edge of the end mill cutter. A great amount of time must be spent in hand finishing the surface to eliminate the scalloping and bring the dimensions in line with desired tolerances.

SUMMARY OF THE INVENTION

This invention provides for the use of a toroidal cutter, held at an acture angle to the plunge direction of the three axis milling machine, which can be passed back and forth across the contoured die surface, following the contours over both high and low points and cutting in both directions. The use of such a cutter in such a manner makes it unnecessary, in most cases, to subdivide the contoured surface into subsurfaces for separate milling and eliminates much time consuming wasted motion of the cutter, since the cutter can cut with movement in both directions. In addition, the larger diameter of the toroidal cutter provides an added advantage of shallower and wider scalloping in the milled surface to reduce hand finishing time.

The inventor, upon first suggesting this approach, was informed by those skilled in the art of contoured die milling that the approach was impractical, since a sufficiently large power, such as ten horsepower, could not be transmitted through gears or other practical means from a three axis milling machine to a cutter held at an angle to the plunge direction of the machine. However, applicant has successfully tested the method by contour milling a die with a toroidal cutter and three axis milling machine at a power output of 10 horsepower.

The assignee of this invention first caused the apparatus which applicant used for accomplishing his invention to be disclosed anonymously in the publication Research Disclosures in April, 1976. This application has been filed within one year of said publication.

Further details and advantages of this invention will be apparent from the accompanying drawings and following description of the preferred embodiment.

DESCRIPTION OF THE PREFERRED EMBODIMENT

Figure 1A:
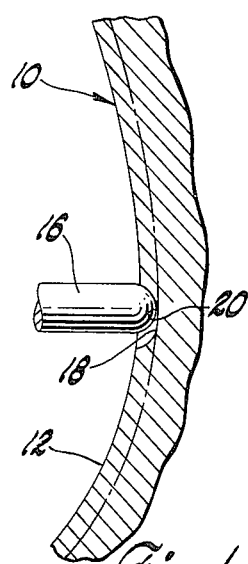
FIGS. 1a, 1b and 1c and 1d show the prior art method of contour milling a concave die surface.

FIG. 1 shows the prior art method of contour milling a concave surface. A die 10 with a rough stock surface 12 is to be milled to a new surface 14. The distance between surfaces 12 and 14 is exaggerated for clarity in FIG. 1, as is the distance between similar surface in other Figures. As shown in FIG. 1a, a ball nose cutter 16 first must create a channel 18 at the low point 20 of surface 12, channel 18 being wide enough for the insertion of an end mill cutter 22. The three axis milling machine can move cutters 16 and 22 in a plunge direction along the cutter axis, and in two other directions forming a three axis Cartesian coordinate system with the plunge direction, the cutter remaining held aligned in the plunge direction at all times.

Figure 1B:
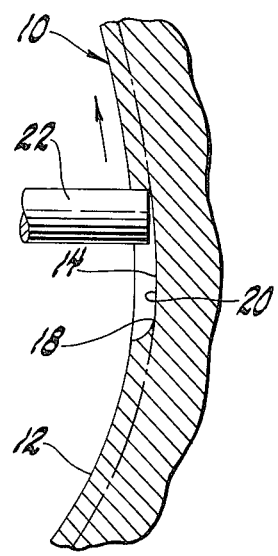
Figure 1C:
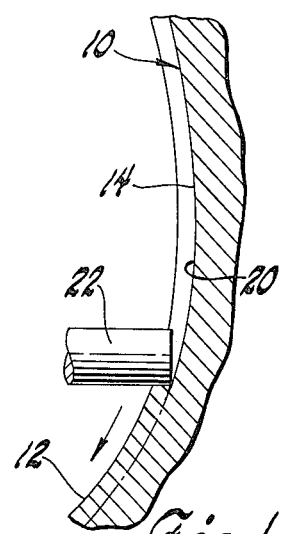
Figure 1D:
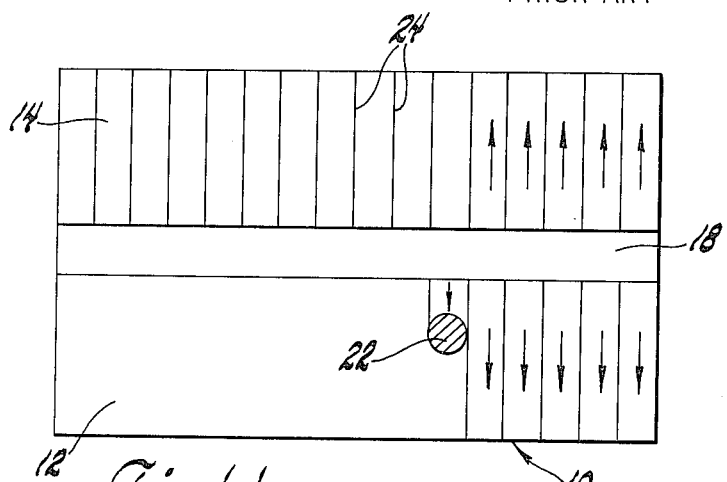

FIG. 1b shows an end mill cutter 22 sweeping upward from channel 18 to mill the upper half of die 10 with repeated upward sweeps. FIGS. 1c and 1d show the end mill cutter sweeping downward from channel 18 to mill the lower half of die 10 with repeated downward sweeps. FIG. 1d shows the scallops in surface 14 created by the curvature of the cutting edge of end mill cutter 22. Scallops 24 must be removed by hand finishing to create a smooth surface within specified tolerances. Although die 10 is shown as a complete die, it might actually be just one portion of a die with a more complex contoured surface. In the latter case, each portion corresponding to die 10 in FIG. 1 would have to be separately subjected to the steps shown in FIG. 1.

Figure 2A:
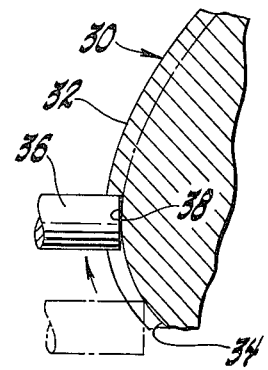
FIGS. 2a, 2b and 2c show the prior art method of contour milling a convex die surface.
Figure 2B:
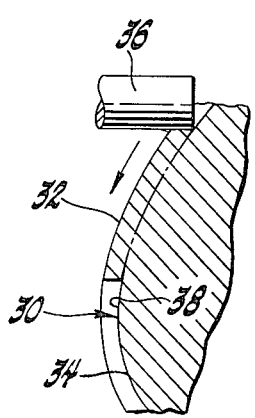
Figure 2C:
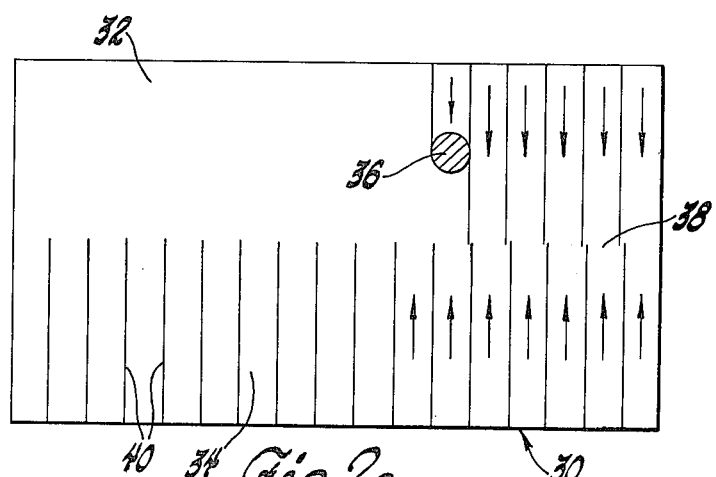

FIG. 2 shows the prior art method of contour milling a convex surface. A die 30 has a rough stock surface 32 to be milled to a new surface 34. FIG. 2a shows an end mill cutter proceeding from one end of die 30 to the high point 38 of surface 32 to mill the lower portion of the die with repeated upward sweeps. FIG. 2b shows the end mill cutter 36 proceeding from the other end of die 30 to the high point 38 to mill the upper portion of the die with repeated downward sweeps. FIG. 2c shows the scallops 40 left by cutter 36 in surface 34. As in the concave die 10 of FIG. 1, the convex die 30 of FIG. 2 can be a portion of a die; and in fact, a die may have a plurality of concave and convex portions, each of which would have to be milled separately according to the methods shown in FIGS. 1 and 2 and described herein.

Figure 3A:
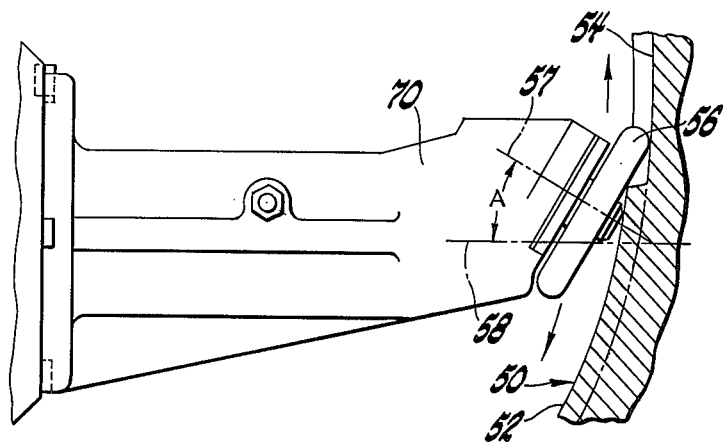
FIGS. 3a, 3b and 3c show the method of contour milling a die surface according to this invention.
Figure 3B:
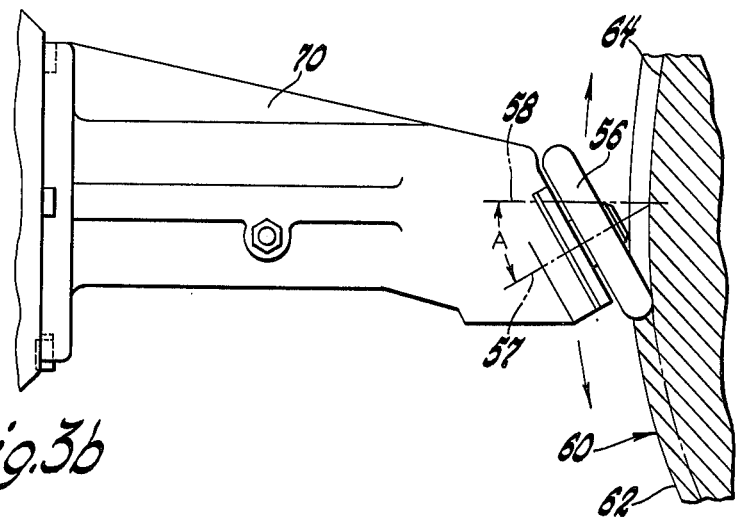
Figure 3C:
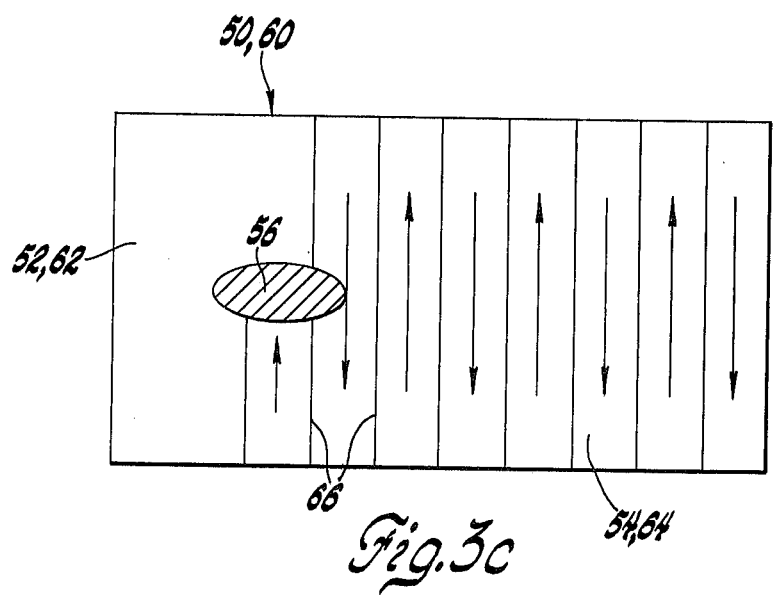

FIG. 3 shows a method of contour milling according to this invention. A die 50 having a concave rough stock surface 52 is milled to a new surface 54 by a toroidal cutter 56 having an axis 57 at an angle A with the plunge axis or plunge direction 58 of the milling machine cutter 56 being swept across surface 52 in either direction from one end of die 50 to the other, as shown in FIG. 3a. Similarly, in FIG. 3b, a die 60 having a rough stock surface 62 is milled to a new surface 64 by cutter 56 sweeping over it from one end to the other in either direction. FIG. 3c shows the scallops 66 left by cutter 56, which scallops 66 are wider and shallower than scallops 24 of FIG. 1d or scallops 40 of FIG. 2c because of the larger diameter of cutter 56.

As FIG. 3c indicates, it could represent either of dies 50 or 60 and look the same. In addition, if a die has a plurality of concave and convex regions corresponding to dies 50 and 60, toroidal cutter 56 could still sweep back and forth from one end to the other, following the contour of the surface; and the surface would still appear as in FIG. 3c. Finally, the wider, shallower scallops 66 make hand finishing less difficult and time consuming.

Although the angle A formed by the axis 57 of toroidal cutter 56 and plunge axis 58 remains constant during the milling operation, the orientation of axis 57 with respect to the up and down directions of FIG. 3a may be changed through a full circle of 360° as desired. A fixed orientation, an orientation that is fixed for a portion of the milling operation and changed for another portion of the milling operation and an orientation that is continually varied and controlled during the milling operation are all embodiments conceived by the inventor as variations of his invention within the scope thereof.

Figure 4:
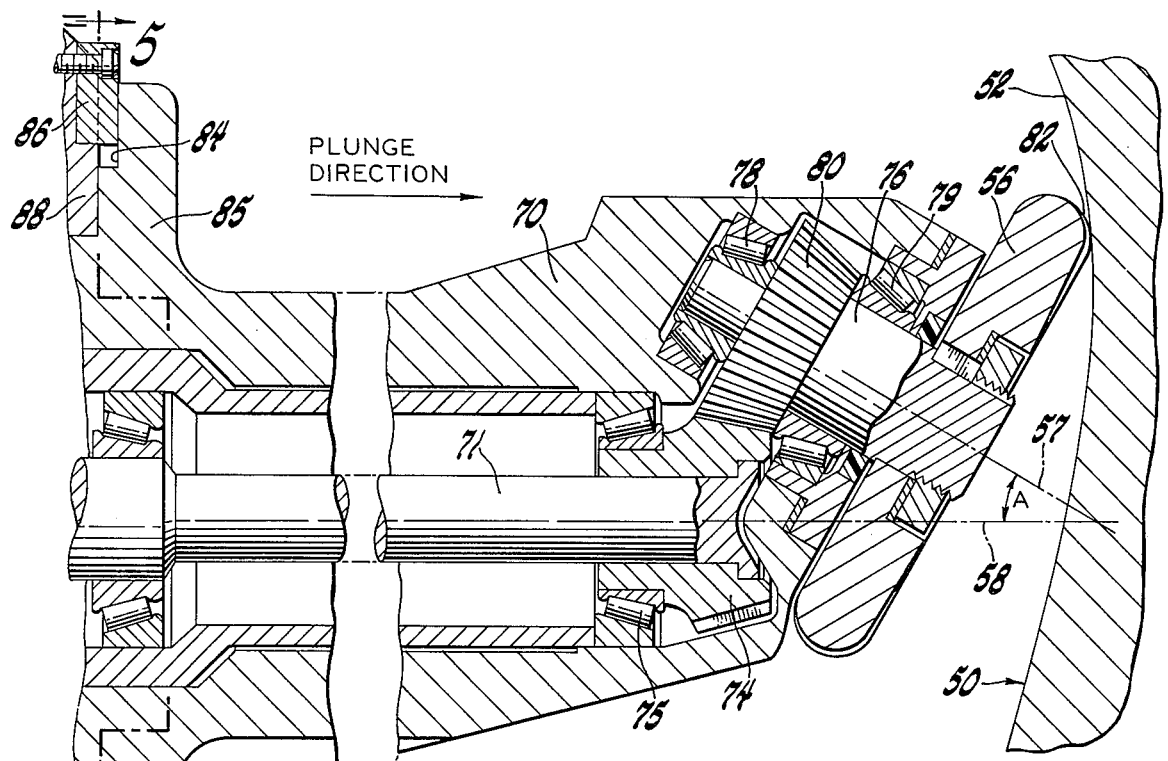
FIG. 4 shows apparatus for adapting a toroidal cutter to a three axis milling machine for use according to this invention.
Figure 5:
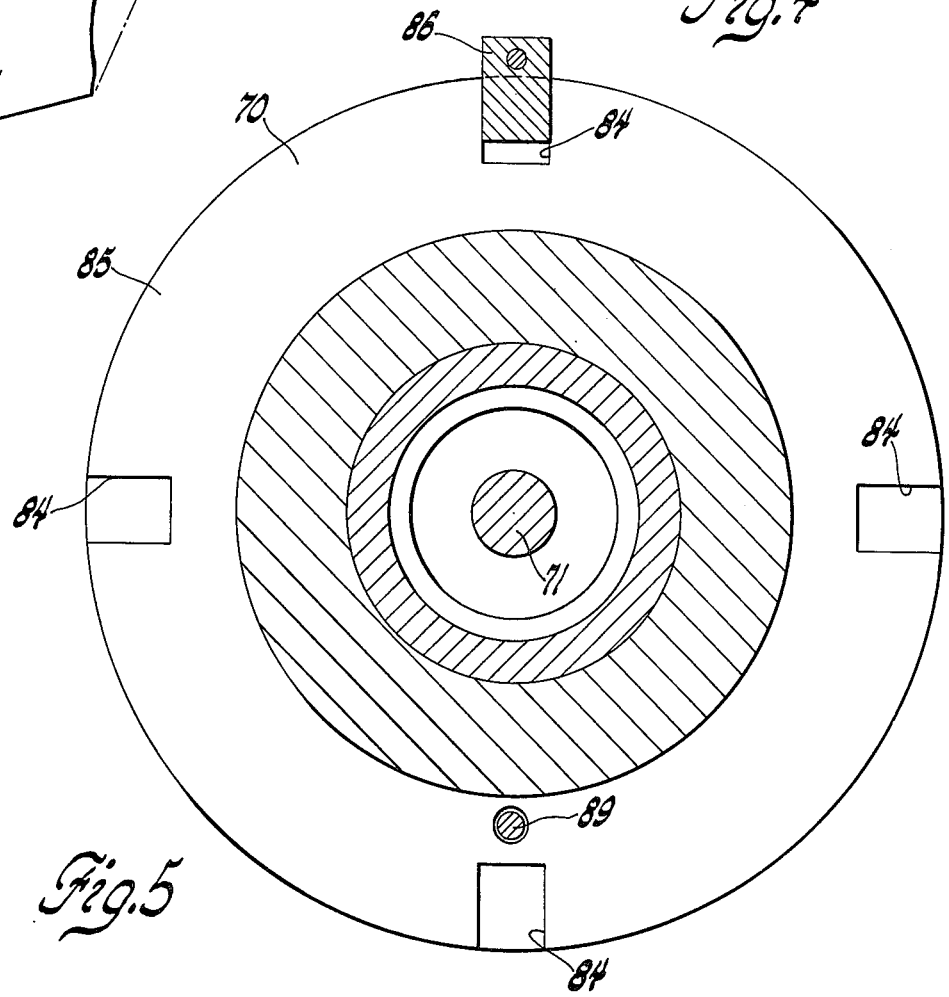
FIG. 5 is a section view along lines 5—5 in FIG. 4.

FIGS. 4 and 5 disclose a holder for adapting a toroidal cutter to a three axis milling machine in accordance with applicant's invention. Referring to FIG. 4, a holder 70 includes a shaft 71 aligned in the plunge direction of the milling machine and adapted to engage with one end a standard three axis milling machine and having attached thereto at its other end a spiral bevel gear 74 supported in a bearing assembly 75. Another shaft 76, supported in bearing assemblies 78 and 79, has an axis 57 which forms an angle A with axis 58 of shaft 71. Shaft 76 has mounted at one end a spiral bevel gear 80 which engages gear 74 and has mounted at the other end, projecting beyond holder 70, the toroidal cutter 56.

The angle A between axes 57 and 58 is an acute angle which must be significantly greater than zero degrees to bring the outer cutting surface 82 of toroidal cutter 56 into contact with surface 52 of die 50. The optimum angle for A has yet to be determined; and, in fact, it may vary according to the particular dies to be milled. The greater the angle A, the more difficult it is to transmit the necessary torque through gears 74 and 80; however, at least for small angles, the greater the angle A, the more versatile is the holder 70 in presenting cutter 56 to a variety of contoured die surfaces. Applicant has successfully tested the apparatus and method by milling up to 10 horsepower at an angle A of 30°. This is not necessarily the optimum angle but is one that has been shown to work satisfactorily.

In order to allow change in the orientation of cutter 56 by rotating axis 57 around axis 58 while keeping angle A constant, holder 70 is rotated about an axis parallel to axis 58. In this embodiment, four slots 84 are provided in the rotatable portion 85 of holder 70. A key 86, fixed to stationary portion 88 of holder 70, projects outward into one of slots 84 to index rotatable portion 85 to a precise orientation. This orientation can be changed by loosening one or more bolts 89 which hold rotatable portion 85 to stationary portion 88 of holder 70, rotating rotatable portion 85 until key 86 aligns with a new slot 84 and retightening bolts 89. A more elaborate holder 70 could provide more slots 84 or continuous rotational capability of rotatable portion 88. In addition, one skilled in the art might design an even more elaborate holder 70 with provision for powered and signal controlled rotation of rotatable portion 88.

The embodiment described above is a preferred embodiment of this invention and apparatus for carrying out this invention; but equivalent embodiments will occur to those skilled in the art. Therefore, this invention should be limited only by the claim which follows.

The embodiments of the invention in which an exclusive property or privilege is claimed are defined as follows:

1. A method of milling an arcuately contoured die surface using a three axis milling machine in which said milling machine includes a cutter support having rotatable power output means and being movable in a direction parallel to a plunge axis and simultaneously in a direction perpendicular thereto comprising the steps of:
    supporting a rotatable toroidal cutter in said cutter support with its axis substantially greater than zero degrees with respect to the plunge axis,
    drivingly coupling the cutter to said power output means,
    feeding said toroidal cutter into a predetermined depth of engagement with the die surface by relative movement therebetween in a direction parallel to the plunge axis, and
    feeding said toroidal cutter relative to said die surface in a plurality of parallel passes across said surface in the direction of the curvature thereof at said depth of engagement therewith, whereby substantially the entire die surface is machined.

* * * * *